Figure 1:
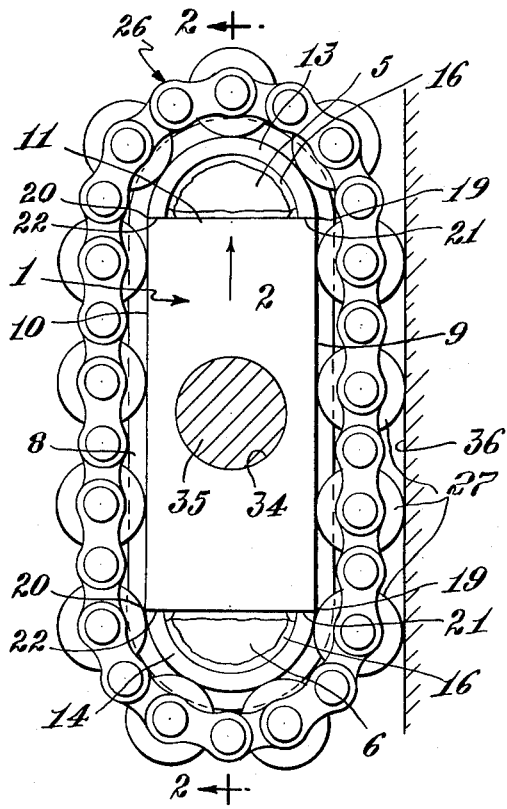

Nov. 15, 1955      N. WARSHAW      2,723,886

ANTIFRICTION DEVICE

Filed June 10, 1953

Inventor
Nathaniel Warshaw
by Roberts, Cushman & Grover
Atty's

# United States Patent Office 2,723,886
Patented Nov. 15, 1955

2,723,886

ANTIFRICTION DEVICE

Nathaniel Warshaw, Brookline, Mass., assignor to Market Forge Company, Everett, Mass., a corporation of Massachusetts Application June 10, 1953, Serial No. 360,628

4 Claims. (Cl. 308—6)

This invention relates to antifriction devices and more particularly to an antifriction device of the type for use in the antifriction mounting of relative moving parts where at least one of such parts may be subjected to severe torque forces as is present for example, but not by way of limitation, in a high lift truck between the load lifting platform and the standards upon which the platform is mounted for vertical movement.

Heretofore such antifriction devices have taken the form of a heavy unitary bearing support requiring accurate and very expensive machining and about which an endless chain roller travels. Because of misalignment of the bearing surfaces from the parallel either through inaccurate machining or distortion caused by the stresses of heavy loading, the endless chain roller has become quickly displaced from the bearing support in spite of the provision of substantially heavy side plates to prevent such displacement.

The object of the present invention is to provide an antifriction device of the type described which, without sacrifice of durability, is of simple and light construction and easy and economical to manufacture effecting substantial savings in manufacturing cost and which, while continuing to insure a minimum of friction between the relative moving parts, insures retention of the endless chain roller upon the bearing support at all times in spite of misalignment or distortion of the bearing surfaces from the parallel, thereby to overcome and eliminate the aforesaid disadvantages present in such antifriction devices heretofore used.

In one aspect the invention involves an antifriction device comprising in combination a bearing support having a rigid bearing surface, a raised rib extending along said bearing surface constituting a track and a series of flexibly connected rollers mounted for movement along said bearing surface, each roller having an annular groove accommodating said track.

In a more specific aspect the bearing support is a block at least one side edge of the block having a rigid bearing surface and a raised rib extending along said bearing surface, the series of flexibly connected rollers is endless, and means are provided for guiding the rollers about the ends and opposite side edge of the block.

In a still more specific aspect the bearing support includes a pair of outer blocks and an intermediate plate connected together, at least the corresponding side edges at one side of the blocks having rigid bearing surfaces, the peripheral edge of the plate extending outwardly beyond at least the said corresponding side edges at one side of the blocks and constituting a track. The blocks have substantially arcuate semi-cylindrical end ways connected at their ends and the peripheral edge of the plate extends outwardly beyond said end ways and the corresponding side edges at the opposite side of the blocks, the endless series of flexibly connected rollers being mounted for movement about said end ways and along said bearing surfaces and the corresponding side edges at the opposite side of the blocks.

Figure 2:
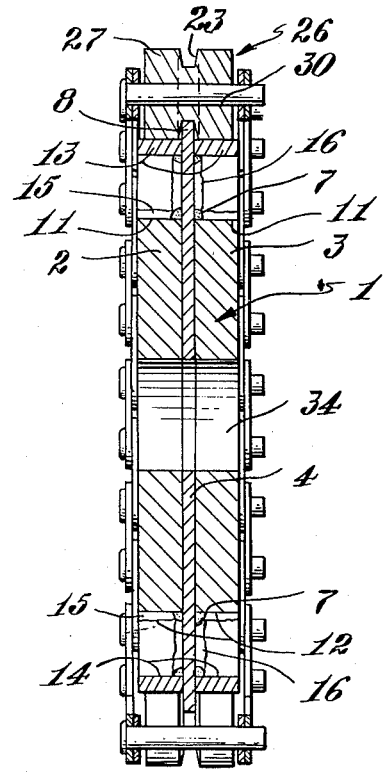
Figure 3:
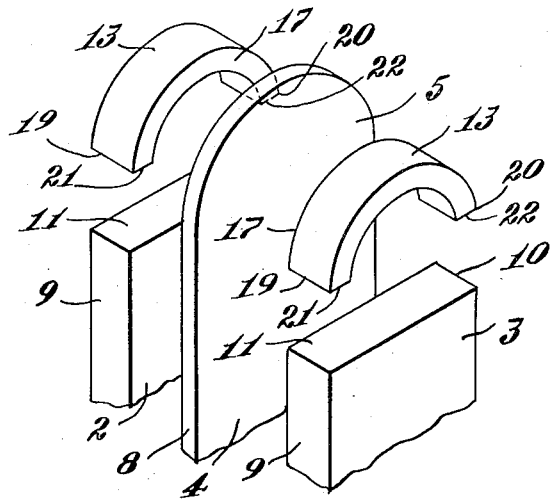

For the purpose of illustration a preferred embodiment of the invention is shown in the accompanying drawings in which, Fig. 1 is a side elevation of the antifriction device;
Fig. 2 is a section along the line 2—2 of Fig. 1;
Fig. 3 is an exploded view of one end of the bearing support of Fig. 1; and
Fig. 4 is a fragmentary front elevation of the chain roller of Fig. 1.

Referring now more particularly to the drawings, the numeral 1 represents in general a bearing support or block comprising a pair of thin rectangular rigid outer blocks 2 and 3 preferably of metal on the order of ⅜" in thickness which can be formed by stamping rather than by machining and a thin intermediate plate 4 also preferably of metal and of greater width and length than the blocks and having rounded ends 5 and 6. The blocks and plate are connected together by suitable means here shown as welds 7, the peripheral edge of the plate projecting outwardly beyond the corresponding side edges 9 and 10 of the blocks at their opposite sides and the rounded ends of the plate projecting outwardly beyond the corresponding ends 11 and 12 of the blocks and constituting a track 8. At least the corresponding side edges at one side of the blocks and here designated, by way of example, as corresponding side edges 9 are formed with rigid bearing surfaces.

Substantially semi-cylindrical endways 13 and 14 are preferably formed by cutting longitudinally in half desired lengths of metal tubing having a diameter slightly longer than the width of the blocks 2 and 3, the width of the cut being such that when the halves or endways are separated the outer edges 19 and 20 of the ends 21 and 22 of each half are spaced apart the same distance as the width of the blocks. The endways 13 and 14 are connected at their ends 21 and 22 to the corresponding ends 11 and 12 of the blocks respectively and at their inner sides 17 to the rounded ends 5 and 6 of the plate 4 by suitable means here shown as welds 15 and 16 respectively, whereby the outer convex faces of the end ways at their junction with the blocks constitute a smooth continuation of the outer surfaces of the corresponding side edges 9 and 10 of the blocks, the rounded peripheral edge of the plate projecting outwardly beyond the outer convex surface of the endways to constitute a continuation of the track 8.

Figure 4:
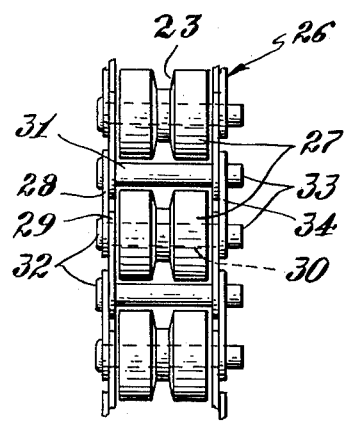

An endless chain roller 26 comprises a series of spaced parallel cylindrical rollers 27, adjacent rollers being flexibly connected together at their opposite ends by suitable means best shown in Fig. 4 as overlapping links 28 and 29, pivot pins 30 extending through the links and rollers, and pivot pins 31 intermediate the adjacent rollers and extending only through the links. The pivot pins 30 and 31 are headed at one end 32 and are secured in place at their opposite ends 33 by cotter pins 34 extending through adjacent pairs of pivot pins 30 and 31. Each roller 27 is formed intermediate its ends with an annular groove 23 and the endless chain roller is mounted on the bearing support 2 for movement about the corresponding side edges 9 and 10 of the blocks 2 and 3 and about the end ways 13 and 14 with the annular grooves of the rollers accommodating the track 8 and the outer peripheries of the rollers engaging the outer surfaces of said corresponding side edges and ways (Fig. 1).

For the purpose of illustrating a typical use, the antifriction device above described is shown in Fig. 1 as in engagement with a parallel flat bearing surface designated by the reference numeral 36, it being understood that the bearing support 1 and bearing surface 36 are one or both movable relative to the other. A series of the rollers 27 are disposed between the bearing surfaces of the corresponding side edges 9 of the bearing support 1 and the bearing surface 36, thereby to provide bearings therebetween at a plurality of spaced bearing points insuring a minimum of friction between said bearing surfaces. To further insure the continued bearing engagement of the rollers at a plurality of bearing points in spite of slight variances in the bearing surfaces or the rollers due to lack of uniformity in manufacture or wearing of such parts, the bearing support 1 is preferably formed with a central opening 34 which extends through the blocks 2 and 3 and plate 4 for the reception of a pivot 35 whereby the bearing support is pivotally mounted for rocking movement toward the bearing surface 36.

As relative movement between the bearing support 1 and the bearing 36, here shown by way of example as movement of the bearing support 1 in the direction of the arrow, is commenced, it is clearly apparent that the rollers 27 disposed between said bearing surfaces will be caused to travel in the opposite direction along the corresponding side edges 9 and that because of the cooperation between the track 8 and annular grooves 23 of the rollers, said rollers will be prevented from becoming displaced from said edges 9 by reason of any misalignment of the bearing surfaces from the parallel because of distortion caused by the stresses of heavy loading thereon.

As each roller reaches the junction between the corresponding side edges 9 and the end ways 14 it will be noted that continued travel of the roller will cause it to follow the convex surface of the end ways, thereby to separate the roller from engagement with the bearing surface 36 and to release any bearing pressure therefrom. For this reason the end ways 13 and 14 can be constructed in the lighter and more economical manner above described. Thereafter, said roller will travel about the end ways 14, thence along the corresponding side edges 10 at the opposite sides of blocks 2 and 3 and thence about the end ways 13 to return into bearing engagement with the bearing surface 36, such path of travel being guided by the cooperation between the track 8 and the annular groove 23 of said roller.

It should be understood that the present disclosure is for the purpose of illustration only and that this invention includes all modifications and equivalents which fall within the scope of the appended claims.

I claim:

1. An elongate block for supporting an endless series of connected rollers, each formed with an annular rail-accommodating groove intermediate its ends, comprising a pair of rectangular shaped outer blocks and a relatively elongate intermediate plate connected together, the corresponding side edges of the blocks at least at one side of the blocks having rigid bearing surfaces, the ends of the plate being arcuate and the ends and side edges of the plate extending beyond the ends and sides of the blocks, respectively, and constituting a guide rail, and semi-annular end members of a width equal to the thickness of the blocks and connected at their ends to the outer marginal portions of the ends of the blocks, the curved outer faces of the semi-annular members being uniformly spaced inwardly of the outer edge of the arcuate ends of the plate and constituting tracks for the rollers as they pass about the ends of the block with the guide rail accommodated within their grooves.

2. An elongate block for supporting an endless series of connected rollers, each formed with an annular rail-accommodating groove intermediate its ends, comprising a pair of rectangular shaped outer blocks and a relatively elongate intermediate plate connected together, the corresponding side edges of the blocks at least at one side of the blocks having rigid bearing surfaces, the ends of the plate being arcuate and the ends and side edges of the plate extending beyond the ends and sides of the blocks, respectively, and constituting a guide rail, and semi-annular end members of a width equal to the thickness of the blocks disposed with their ends in abutting relationship with the ends of the blocks and connected at their inner side edges to the sides of the extended ends of the plate, the curved outer faces of the semi-annular members being uniformly spaced inwardly of the outer edge of the arcuate ends of the plate and constituting tracks for the rollers as they pass about the ends of the block with the guide rail accommodated within their grooves.

3. The method of making an elongate block for supporting an endless series of connected rollers each formed with an annular rail-accommodating groove intermediate its ends, comprising sandwiching an elongate plate with arcuate ends between a pair of rectangular blocks so that the ends and side edges of the plate extend beyond the ends and sides of the blocks respectively to constitute a guide rail, and connecting the ends of semi-annular members of a width equal to the thickness of the blocks to the ends of the blocks, the curved outer faces of the semi-annular members being uniformly spaced inwardly of the outer edge of the arcuate ends of the plate and constituting tracks for the rollers as they pass about the ends of the block with the guide rail accommodated within their grooves.

4. The method of making an elongate block for supporting an endless series of connected rollers each formed with an annular rail-accommodating groove intermediate its ends, comprising sandwiching an elongate plate with arcuate ends between a pair of rectangular blocks so that the ends and side edges of the plate extend beyond the ends and sides of the blocks, respectively, to constitute a guide rail, and connecting the inner edges of semi-annular members of a width equal to the thickness of the blocks to the sides of the extended ends of the plate, the ends of the semi-annular members abutting the ends of the blocks and the curved outer faces of the semi-annular members being uniformly spaced inwardly of the outer edge of the arcuate ends of the plate and constituting tracks for the rollers as they pass about the ends of the block with the guide rail accommodated within their grooves.

References Cited in the file of this patent

UNITED STATES PATENTS

| | | |
|---|---|---|
| 422,903 | Beaupre | Mar. 11, 1890 |
| 426,720 | Flint | Apr. 29, 1890 |
| 992,008 | Lane | May 8, 1911 |
| 2,033,649 | Rendleman | Mar. 10, 1936 |
| 2,230,637 | Biedermann | Feb. 4, 1941 |
| 2,366,238 | Clausen | Jan. 2, 1945 |